United States Patent [19]

Heinz et al.

[11] Patent Number: 4,837,296
[45] Date of Patent: Jun. 6, 1989

[54] PREPARATION OF POLYARYL ETHER KETONES

[75] Inventors: Gerhard Heinz, Weisenheim; Juergen Koch, Neuhofen; Manfred Eggersdorfer, Frankenthal; Jochem Henkelmann, Mutterstadt, all of Fed. Rep. of Germany

[73] Assignee: BASF Aktiengesellschaft, Ludwigshafen, Fed. Rep. of Germany

[21] Appl. No.: 141,726

[22] Filed: Jan. 11, 1988

[30] Foreign Application Priority Data

Jan. 14, 1987 [DE] Fed. Rep. of Germany ....... 3700808

[51] Int. Cl.$^4$ .................... C08G 8/02; C08G 14/00
[52] U.S. Cl. .................................. 528/125; 528/126; 528/128; 528/174
[58] Field of Search ................ 528/125, 126, 128, 174

[56] References Cited

U.S. PATENT DOCUMENTS 4,176,222 11/1979 Cinderey et al. ............... 528/125
4,320,224 3/1982 Rose et al. ..................... 528/125

*Primary Examiner*—John Kight
*Assistant Examiner*—M. L. Moore
*Attorney, Agent, or Firm*—Oblon, Fisher, Spivak, McClelland & Maier

[57] ABSTRACT

Polyaryl ether ketones are prepared by reacting aromatic dihydroxy compounds with aromatic dihalogen compounds in polar aprotic solvents in the presence of alkali metal carbonates, in particular by reacting aromatic dihydroxy compounds I

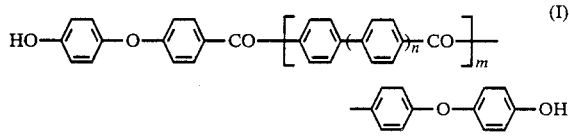

or ring-substituted $C_1$-$C_8$-alkyl, $C_1$-$C_8$-alkoxy, aryl, chlorine or fluorine derivatives thereof, n and m each being 0 or 1, with aromatic dihalogen compounds

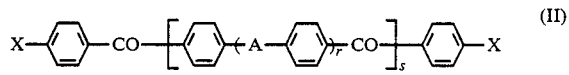

or ring-substituted $C_1$-$C_8$-alkyl, $C_1$-$C_8$-alkoxy, aryl, chlorine or fluorine derivatives thereof, r and s each being 0 or 1, A being oxygen or a chemical bond and X being chlorine or fluorine.

4 Claims, No Drawings

PREPARATION OF POLYARYL ETHER KETONES

The present invention relates to a process for preparing a polyaryl ether ketone by reacting an aromatic dihydroxy compound with an aromatic dihalogen compound in a polar aprotic solvet in the presence of an alkali metal carbonate.

Preferred embodiments of the process according to the invention are revealed in the subclaims.

EP-A-1,879 discloses a process for preparing polyaryl ether ketones having repeat units

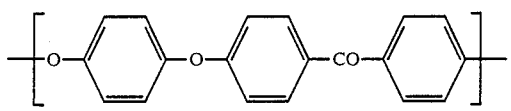

by reacting hydroquinone with 4,4'-difluorobenzophenone. This process has the disadvantage that large amounts of the expensive monomer 4,4'-difluorobenzophenone are required.

It is an object of the present invention to provide a process for preparing a polyaryl ether ketone in a less costly manner without deterioration in the properties of the product. It is a further object to reduce in general the amount of fluorine-containing monomer required in the process.

We have found that these objects are achieved with a process of the type defined at the beginning, which comprises reacting an aromatic dihydroxy compound of the general formula I

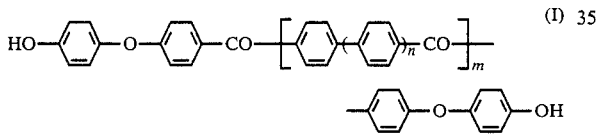

or a ring-substituted $C_1$–$C_8$-alkyl, $C_1$–$C_8$-alkoxy, aryl, chlorine or fluorine derivative thereof, n and m each being 0 or 1, with an aromatic dihalogen compound of the general formula II

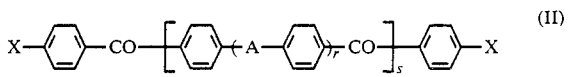

or a ring-substituted $C_1$–$C_8$-alkoxy, aryl, chlorine or fluorine derivative thereof, r and s each being 0 or 1, A being oxygen or a chemical bond and X being chlorine or fluorine.

An advantage of the process according to the invention compared with the process disclosed for example in EP-A-1,879 is that by using the dihydroxy compound of the general formula I, which, compared with the prior art monomers, has a higher molecular weight, the proportion of the dihalogen compound, in particular difluorine compound, can be reduced. This may be illustrated by the following example concerning the preparation of PEEK (poly(ether ether ketone)):

prior art process:
hydroquinone + 4,4'-difluorobenzophenone ⟶ product
1 mole (110 g)   1 mole (218 g)                288 g

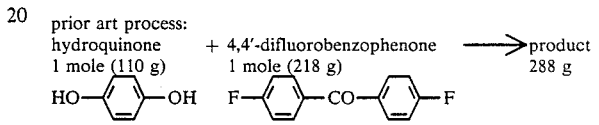

process of the invention:
4,4'-di(4-hydroxyphenoxy)benzophenone +
1 mole (398 g)

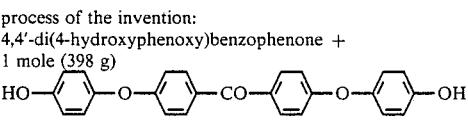

4,4'-difluorobenzophenone ⟶ product
1 mole (218 g)                576 g

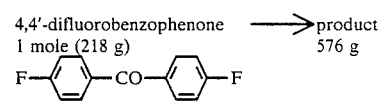

This shows that in the process according to the invention the use of the dihydroxy compound of the general formula I makes it possible to produce twice the amount of product for the same amount of 4,4'-difluorobenzophenone than in the prior art. Similar calculations can also be performed for other prior art polyaryl ether ketones, for example for the preparation of PEEKK (where E is an ether bridge and K a keto bridge in the polymer).

The general formula I covers the compounds

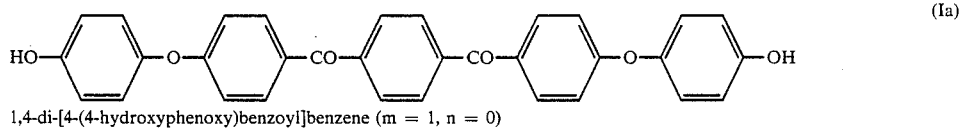

1,4-di-[4-(4-hydroxyphenoxy)benzoyl]benzene (m = 1, n = 0)

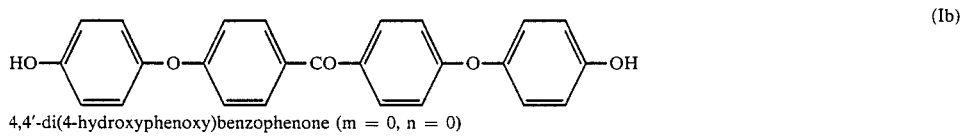

4,4'-di(4-hydroxyphenoxy)benzophenone (m = 0, n = 0)

and

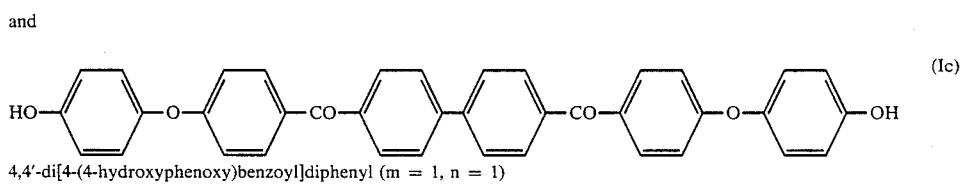

4,4'-di[4-(4-hydroxyphenoxy)benzoyl]diphenyl (m = 1, n = 1)

and the ring-substituted $C_1$–$C_8$-alkyl, $C_1$–$C_8$-alkoxy, aryl, chlorine or fluorine derivatives thereof. Examples of substituents are methyl, ethyl, n-, or i- or t-butyl, the corresponding alkoxy groups and also phenyl groups. In general, however, the unsubstituted compounds Ia-Ic are preferred.

Ia can be prepared, for example, by reacting 1,4-di(4-chlorobenzoyl)benzene with an alkali metal salt of hydroquinone mono-t-butyl ether and subsequent cleavage of the t-butyl ether in accordance wih the following reaction scheme:

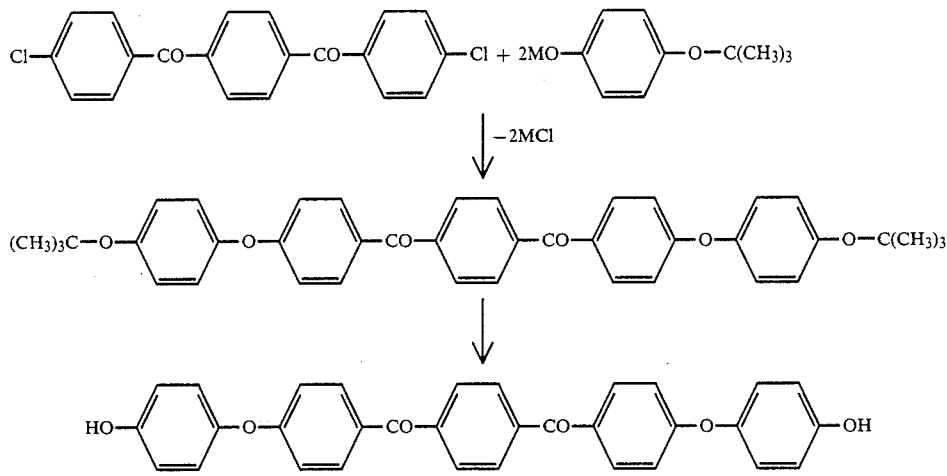

The compounds Ib and Ic are obtainable in a similar manner by replacing 1,4-di(4-chlorobenzoyl)benzene by 4,4′-dichlorobenzophenone and 4,4′-di(4-chlorobenzoyl)diphenyl respectively.

The conditions under which reactions of this type are carried out are commonly known, so that no details are required here.

The aromatic dihalogen compound II in the process according to the invention is preferably the fluorine compound 4,4′-difluorobenzophenone    IIa

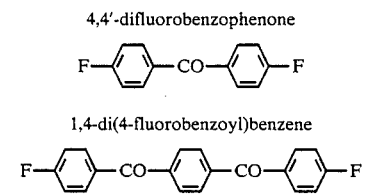

1,4-di(4-fluorobenzoyl)benzene    IIb

F—⌬—CO—⌬—CO—⌬—F 4,4′-di(4-fluorobenzoyl)diphenyl ether    IIc

F—⌬—CO—⌬—O—⌬—CO—⌬—F or 1,10-di(4-fluorobenzoyl)diphenyl    IId

F—⌬—CO—⌬—⌬—CO—⌬—F

In principle, it is true, it is also possible to use the chlorine compounds or compounds containing both chlorine and fluorine, but the fluorine compounds are preferred. Concerning preferred substituents on the aromatic ring, the remarks concering the dihydroxy compounds are also applicable here. Again, preference is given to the unsubstituted compounds IIa to IIc.

Arranging the products obtainable by the process according to the invention by reacting unsubstituted compounds of the general formula I and II in a pattern produces the following picture:

| Starting compounds | Product |
|---|---|
| Ia + IIa | PEEKKEEK |
| Ia + IIb | PEEKK |
| Ia + IIc | PEEKKEEKEK |
| Ia + IId | PEEKKEEK-K* |
| Ib + IIa | PEEK |
| Ib + IIb | PEEKEEKK |
| Ib + IIc | PEEKEEKEK |
| Ib + IId | PEEKEEK-K* |
| Ic + IIa | PEEK-KEEK* |
| Ic + IIb | PEEK-KEEKK* |
| Ic + IIc | PEEK-KEEKEK* |
| Ic + IId | PEEK-KEEK-K* |

The products are designated using the usual nomenclature, where E is an ether bridge between two aromatic rings and K is a —CO—bridge.

EXAMPLE: PEEKKEEK (Ia+IIa)

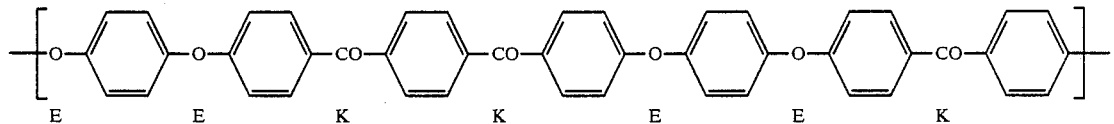

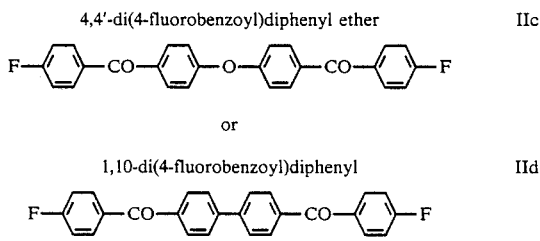

In the products marked *, the hyphen indicates that there is a diphenyl radical between the corresponding bridges.

The process according to the invention is carried out in a polar aprotic solvent in the presence of an alkali metal carbonate as base. The process conditions such as temperatures, pressure, solvent and possible additives (catalysts) are the same as described for example in EP-A-1,879. In consequence, suitable solvents have the formula

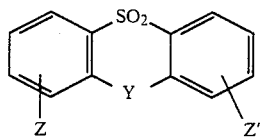

where Y is a chemical bond, oxygen or two hydrogen atoms bonded to the aromatic radical, and Z and Z' are each hydrogen or phenyl.

A particularly preferred version of the process is the reaction in diphenyl sulfone as solvent in the presence of anhydrous potassium carbonate as base.

The amount of diphenyl sulfone ranges in general from 5 to 100 moles, preferably from 5 to 20 moles, per mole of monomer. This produces a preferred solids content of the solution within the range from 5 to 50% by weight, particularly preferably from 10 to 40% by weight.

To regulate and control the desired molecular weight it is possible to add unactivated or activated monohalo and/or mononitro compounds, eg. or even corresponding monohydroxy compounds.

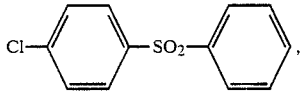

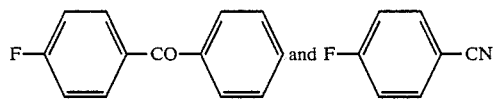

The water formed in the course of the polycondensation can be removed by means of an entrainer, by employing reduced pressure or preferably introducing a nitrogen stream and distilling off.

Suitable entrainers are all those compounds which, under atmospheric pressure, boil within the range of the reaction temperature and are homogeneously miscible with the reaction mixture without entering chemical reactions.

The reaction temperature is generally within the range from 150° to 400° C., preferably 250° to 350° C., the lower temperature limit being determined by the solubility of the resulting product in the solvent system; the total reaction time depends on the desired degree of condensation, but in general is within the range from 0.5 to 15 hours.

After the polycondensation, the product can be stabilized by reacting free phenolate end groups with an arylating or alkylating agent, eg. methyl chloride. This is preferably done at up to 350° C., the lower temperature limit being determined by the solubility of the product in the solvent used.

The reaction product can be worked up in a conventional manner. Advantageously, the melt is turned into a finely divided material which is freed from the high-boiling solvent used by extraction with a suitable solvent, eg. acetone. Thereafter, residues of alkali metal carbonate and alkali metal halide can be removed by washing with water.

By appropriate variation, using a plurality of dihydroxy or dihalogen compounds, it is also possible to use the process according to the invention to prepare copolycondensates (copolyaryl ether ketones).

A random structure is obtained by adding all the monomers together at the same time, while block copolycondensates are obtained if various dihydroxy or dihalogen compounds are added at intervals. Another option is to link blocks prepared by the process according to the invention together to give products having a high molecular weight.

The molecular weight (weight average) of the polyaryl ether ketone obtained by the process according to the invention ranges in general from 10,000 to 150,000, preferably from 15,000 to 100,000, in particular from 18,000 to 80,000.

If the repeat units are arranged in blocks, the molecular weight of the individual blocks ranges in general from 500 to 15,000, in particular from 1,500 to 10,000.

The resulting polyaryl ether ketones can be blended with fillers, pigments and other processing aids.

Examples of reinforcing fillers are asbestos, carbon fibers and preferably glass fibers, the latter having, after incorporation, an average length from 0.05 to 1 mm, preferably from 0.1 to 0.5 mm, and being employed for example in the form of glass fabrics or (surfacing) mats and/or preferably glass filament rovings or chopped glass filament made from low-alkali E glasses from 5 to 20 μm, preferably from 8 to 15 μm, in diameter. The polyaryl ether ketones reinforced with glass filament rovings or cut glass filament contain from 10 to 60% by weight, preferably from 20 to 50% by weight, of the reinforcing agent, based on the total weight, while the impregnated glass fabrics, mats and/or surfacing mats contain from 10 to 80% by weight, preferably from 30 to 60% by weight, of copolymer, based on the total weight. Suitable pigments are for example titanium dioxide, cadium sulfide, zinc sulfide, barium sulfate and carbon black. Examples of other additives and auxiliary substances are dyes, lubricants, eg. polytetrafluoroethylene, graphite or molybdenum disulfide, abrasives, for example carborundum, light stabilizers and hydrolysis inhibitors. Even wollastonite, calcium carbonate, glass balls, quartz powder, sulfur and boron nitride or mixtures thereof are usable. Pigments, additives and auxiliary substances are customarily used in amounts of from 0.01 to 10% by weight, based on the weight of the polyaryl ether ketone.

EXAMPLE 1 (COMPARISON)

109.1 g (0.5 mol) of 4,4'-difluorobenzophenone, 76.02 g (0.55 mol) of finely ground potassium carbonate and 1,000 g of diphenyl sulfone were charged to a three-necked flask equipped with a stirrer, a nitrogen inlet and an air condenser. The temperature was then raised to about 180° C. under nitrogen, melting the diphenyl sulfone, and causing the potassium carbonate to become finely suspended. 55.06 g (0.5 mol) of hydroquinone were then added, and the temperature was raised to 200° C. and maintained for 2 hours. The temperature was then maintained at 240° C., 280° C. and 320° C. for 1 hour in each case.

After the reaction mass had cooled down and solidified, it was ground. The fine powder thus obtained was washed four times for 10 minutes with hot acetone, three times for 10 minutes with boiling water and a further 5 minutes with acetone to remove diphenyl sulfone and inorganic constituents. The polymer powder obtained was dried at 150° C. under reduced pressure for 10 hours.

The polymer, which was composed of repeat units of the formula

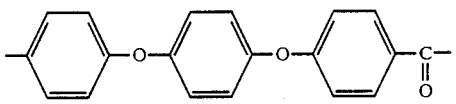

had, according to DSC, a glass transistion temperature of 141° C. and a melting point of 339° C.

The reduced viscosity was 1.80 (measured in concentrated sulfuric acid at 25° C., 1 g of polymer in 100 ml).

EXAMPLE 2

99.6 g (0.25 mol) of 4,4'-di(4-hydroxyphenoxy)benzophenone, 54.55 g (0.25 mol) of 4,4'-difluorobenzophenone, 38.0 g (0.275 mol) of potassium carbonate and 1,000 g of diphenyl sulfone were charged to a four-necked glass flask equipped with a stirrer, a nitrogen inlet, an internal thermometer and an air condenser, heated to 200° C. and maintained at that temperature for 1 hour. The reaction meas was then maintained at 240° C., 280° C. and 320° C. for one hour in each case. After cooling down, the reaction mass was comminuted and worked up as described in Example 1.

The properties of the polymer thus obtained are shown in Table 1.

EXAMPLE 3

125.63 g (0.25 mol) of 1,4-di[4-(4-hydroxyphenoxy)-benzoyl]benzene, 80.56 g (0.25 mol) of 1,4-di(4-fluorobenzoyl)benzene and 38.0 g (0.275 mol) of potassium carbonate were reacted in 1,200 g of diphenyl sulfone under the conditions described in Example 2 and worked up. The properties of the polymer thus obtained are shown in the Table.

EXAMPLE 4

125.63 g (0.25 mol) of 1,4-di[4(4-hydroxyphenoxy)-benzoyl]benzene, 54.55 g (0.25 mol) of 4,4-difluorobenzophenone and 38.0 g (0.275 mol) of potassium carbonate were reacted in 1,200 g of diphenyl sulfone under the conditions described in Example 2 and worked up. The properties of the polymer thus obtained are shown in the Table.

TABLE

| Example | Structure of polymer obtained | Tg in °C. | Tm in °C. | Reduced viscosity |
|---|---|---|---|---|
| 2 | PEEK | 140 | 340 | 2.23 |
| 3 | PEEKK | 163 | 360 | 1.85 |
| 4 | PEEKEEKK | 153 | 351 | 1.92 |
| 5 | PEEK—KEEKK* | 178 | 395 | 1.83 |

*The hyphen indicates that there is a biphenyl unit between the two keto groups.

EXAMPLE 5

144.66 g (0.25 mol) of 4,4'-di[4-(4-hydroxyphenoxy)-benzoyl]diphenyl, 80.56 g (0.25 mol) of 1,4-di(4-fluorobenzoyl)benzene and 38.0 g (0.275 mol) of potassium carbonate were reacted in 1,200 of diphenyl sulfone under the conditions described in Example 2 and worked up. The properties of the polymer thus obtained are shown in the Table.

We claim:

1. A process for preparing a polyaryl ether ketone by reacting an aromatic dihydroxy compound with an aromatic dihalogen compound in a polar aprotic solvent in the presence of an alkali metal carbonate, which comprises reacting an aromatic dihydroxy compound of the formula I

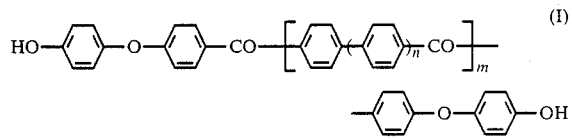

or a ring-substituted $C_1$-$C_8$-alkyl, $C_1$-$C_8$-alkoxy, aryl, chlorine or fluorine derivative thereof, n and m each being 0 or 1, with an aromatic dihalogen compound of the formula II

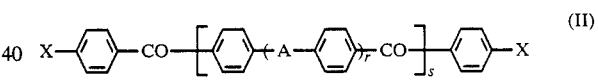

or a ring-substituted $C_1$-$C_8$-alkyl, $C_1$-$C_8$-alkoxy, aryl, chlorine or fluorine derivative thereof, r and s each being 0 or 1, A being oxygen or a chemical bond and X being chlorine or fluorine.

2. A process as claimed in claim 1, wherein the polar aprotic solvent used is diphenyl sulfone.

3. A process as claimed in claim 1, wherein the alkali metal carbonate used is potassium carbonate.

4. A process as claimed in claim 2, wherein the alkali metal carbonate used is potassium carbonate.

* * * * *